United States Patent [19]
Olson

[11] 3,960,327
[45] June 1, 1976

[54] LAWN SPRINKLER PROGRAMMER

[76] Inventor: Richard A. Olson, 3641 Larchwood Circle, Minnetonka, Minn. 55343

[22] Filed: Feb. 6, 1975

[21] Appl. No.: 547,486

[52] U.S. Cl. .................. 239/236; 239/97; 239/DIG. 1; 74/568 FS
[51] Int. Cl.$^2$ .................. B05B 3/08; F16H 53/00
[58] Field of Search .................. 239/97, DIG. 1, 184, 239/227, 236; 74/568 R, 568 FS, 568 M

[56] References Cited

UNITED STATES PATENTS

| | | | |
|---|---|---|---|
| 3,405,871 | 10/1968 | Mullan | 239/97 X R |
| 3,575,347 | 4/1971 | Carlson | 239/97 |
| 3,654,817 | 4/1972 | Kane | 239/236 X |
| 3,878,990 | 4/1975 | Jeraudie | 239/236 |

*Primary Examiner*—Robert S. Ward, Jr.
*Attorney, Agent, or Firm*—Merchant, Gould, Smith, Edell, Welter & Schmidt

[57] ABSTRACT

A pattern control or programming device for a lawn sprinkler having a nozzle-equipped body rotating or oscillating on a generally vertical axis and having a movable guide element for controlling the elevation of discharge of water from the nozzle. A cam having a variable cam surface contour is engaged by a cam follower which imparts movement to the guide element to vary the elevation of water discharge from the nozzle at desired positions of the nozzle during rotary or oscillatory movements of the sprinkler body. A cam mounting structure operates to hold the cam in desired set contours of the cam surface.

7 Claims, 4 Drawing Figures

LAWN SPRINKLER PROGRAMMER

This invention relates to attachments for, or improvements in, lawn sprinklers for the purpose of enabling a sprinkler to water a lawn in different patterns, such as circular, oval, generally rectangular, or other shapes, so as to direct the water only where desired and avoid discharging of the water against nearby buildings or other objects.

SUMMARY OF THE INVENTION

The present invention comprises a programmer or pattern control mechanism for a sprinkler of the type having a support means, a body rotatively mounted on the support means on a generally horizontal axis and having a discharge nozzle, mechanism for effecting turning of the body, and a movable guide element mounted on the body for turning movement therewith and for movements relative to the body for controlling the elevation of discharge of water from the nozzle. The programmer consists of a circumferentially extended cam, cam mounting means for mounting the cam on the support means to encompass the body and supporting the cam in selected contours of its cam surface. A cam follower engages the cam surface to impart elevational control movements to the sprinkler guide element responsive to turning movement of the sprinkler body.

DETAILED DESCRIPTION OF THE PREFERRED EMBODIMENT

Figure 1:
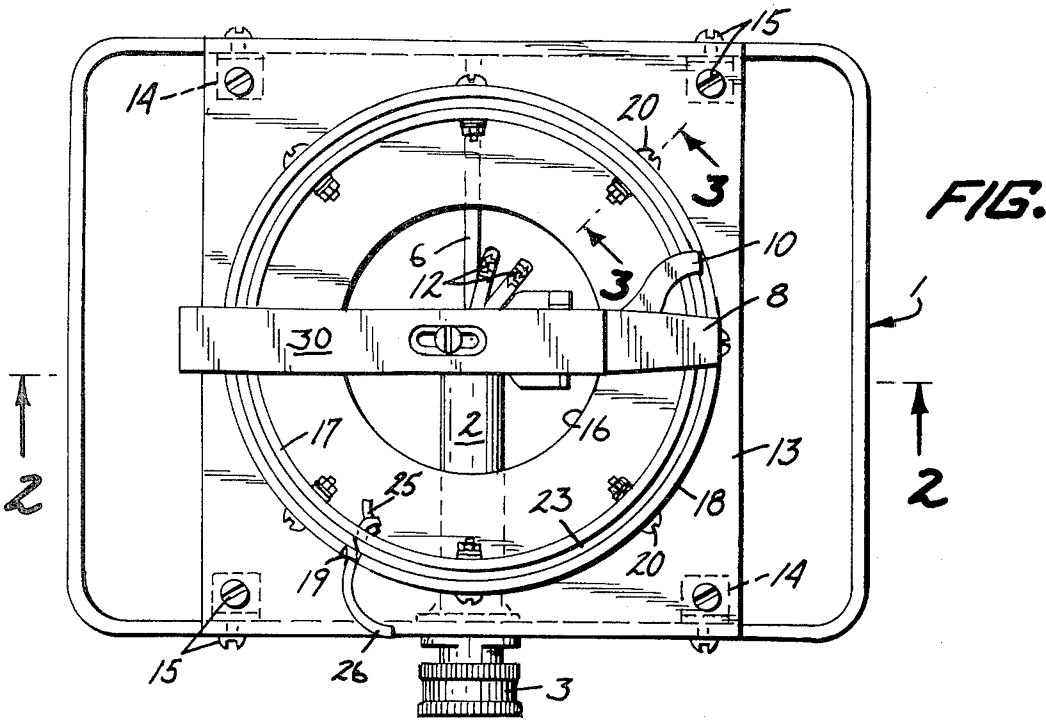
FIG. 1 is view in plan of a lawn sprinkler including the programmer of this invention.
Figure 2:
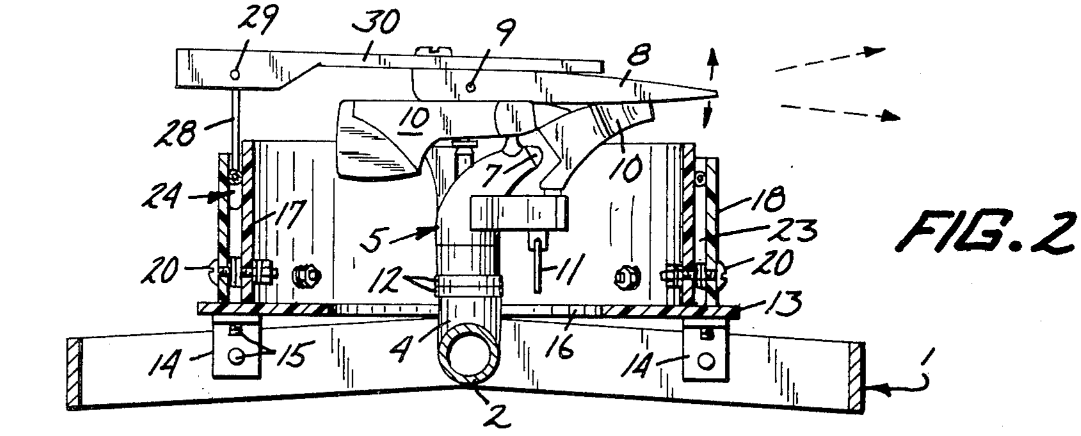
FIG. 2 is a transverse section taken generally on the line 2—2 of FIG. 1.
Figure 3:
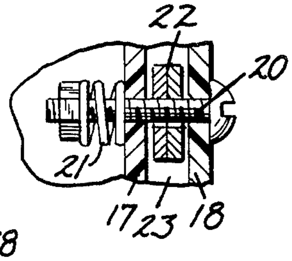
FIG. 3 is an enlarged fragmentary section taken on the line 3—3 of FIG. 1.

The sprinkler programmer of this invention is shown in FIGS. 1 and 2 as being mounted on a conventional lawn sprinkler of the type disclosed in U.S. Pat. No. 3,022,012, and commonly referred to as an oscillating sprinkler. The sprinkler includes a generally rectangular support base 1 that is formed to provide a tubular conduit 2 provided at its outer end with a conventional hose fitting 3 and at its inner end with an upturned portion 4 on which is mounted a body 5 for rotation on a generally vertical axis. A brace member 6 extends from the inner end of the conduit 2 to the opposite side of the support base 1.

The body 5 is provided with a discharge nozzle 7 which directs a stream of water radially outwardly and upwardly with respect to the axis of rotation of the body 5, as shown by a broken arrow in FIG. 2. A discharge guide element 8 is pivotally mounted on the upper end of the body 5 by means of a transverse pivot pin or the like 9, for common rotary movement with the body 5, and for pivotal movement relative to the body 5 on a horizontal axis extending transversely of the axis of rotation of the body 5, for controlling the elevation of discharge of water from the nozzle 7, as indicated by dotted line arrows in FIG. 2. A reaction No. 10 is pivotally mounted on the body 5 for oscillatory movements on the axis of the body 5, and is responsive to discharge of water from the nozzle 7 to effect turning of the body 5 by small increments. A reversing member 11 cooperates with a pair of adjustable stop members 12 to limit rotation of the body 5 in opposite directions, and to reverse the direction of rotation of the body 5.

The sprinkler above described is in a large part disclosed in the above-mentioned U.S. Pat. No. 3,022,012, and is well known to those familiar with the sprinkler art. In and of itself, the sprinkler does not comprise the instant invention. Hence, further detailed showing and description thereof is believed unnecessary and is omitted in the interest of brevity.

In the embodiment of the invention illustrated, a flat rectangular base member 13 is shown as being mounted on the support base 1 by a plurality of brackets 14 and machine screws or the like 15, the base member 13 having a central opening 16 therethrough. A pair of inner and outer cylindrical walls 17 and 18 respectively are concentrically mounted on the base member 13 and extend upwardly therefrom encompassing the body 5 in concentric relation to the axis of rotation of the body 5. The outer cylindrical wall 18 is axially split as indicated at 19 in FIG. 1 to permit flexing of the wall 18 toward and away from the inner cylindrical wall 17. Circumferentially spaced nut equipped screws 20 extend radially through the walls 17 and 18, and are provided with coil compression springs 21 which yieldingly urge the walls 17 and 18 generally radially toward each other. Washers 22 on the screws 20 between the walls 17 and 18 limit radial movement of the walls 17 and 18 toward each other.

Figure 4:
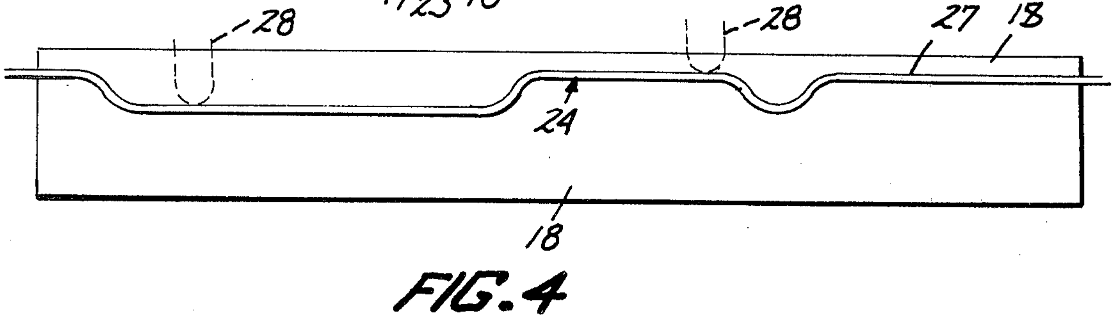
FIG. 4 is a flattened diagrammatic view of the cam and a portion of the cam mounting means of this invention.

The base member 13 and walls 17 and 18 cooperate to define an upwardly opening circumferentially extended channel 23 for reception of a circumferentially elongated cam 24 which, for the purpose of the present example, is in the nature of an elongated elastomeric member such as a rubber tube. One end portion of the cam or tube 24 extends through a suitable opening in the inner wall 17 and is knotted, as indicated at 25, the cam 24 extending circumferentially of the channel 23 and having an outer end 26 that extends outwardly through the axial split portion 19, as shown in FIG. 1. A cam 24 presents an upwardly disposed cam surface 27 which, due to the flexibility of the cam 24, may be formed to any desired contour. One form of contour is shown in the flattened or developed view of FIG. 4.

A cam follower 28 has a lower end portion freely received in the channel 23 for engagement with the cam surface 27 of the cam 24, and an upper end pivotally secured, as indicated at 29, to the outer end portion of a radial arm 30 that is slidably mounted on the discharge guide element 8 for common rotary and swinging movement therewith and for limited radial movement relative thereto.

When it is desired to program the sprinkler to water a lawn or portion thereof in a predetermined pattern, the cam 24 is placed circumferentially in the upper portion of the channel 23 adjacent the upper edges of the walls 17 and 18. With the lower end of the cam follower 28 engaging the upper cam surface portion 27 of the cam 24, the radial arm 30, discharge guide element 8 and body 5 are manually rotated to the extent permitted by the stop members 12. During this rotation, wherever it is desired that the sprinkler discharge water in areas relatively close to the sprinkler, the cam follower 28 is held in a raised position. When the nozzle 7 is directed toward areas where it is desired that the stream of water be discharged at greater distances, the radially outer end portion of the arm 30 and the cam follower 28 are depressed against the cam 24 to move the engaged portion of the cam 24 downwardly in the annular channel 23 so as to permit the opposite end of the discharge guide element 8 to be raised. Thus, the stream of water being discharged from the nozzle 7 will attain a greater elevation and be deposited on the ground in more remote areas from the sprinkler. The desired contours of the cam surface 27 may be formed during the time that water is being discharged from the sprinkler nozzle 7, so that the operator can determine by actual trial what the elevation of the stream of water should be at different portions of the area to be watered. When the pattern has once been established, the sprinkler is permitted to operate without further attention by the operator, the cam follower 28 following the contours of the cam surface 27. Frictional engagement of the walls 17 and 18 against the opposite sides of the cam 24 causes the cam 24 to be held against displacement during rotary or oscillatory movements of the sprinkler during the operation thereof. When it is desired to move the sprinkler to another location and change the contours of the cam surface 27, it is only necessary to grasp the outer end portion 26 of the cam 24 and manually lift the same from the channel 23 and thereafter replace the same in the channel for subsequent re-forming.

While I have shown the programming device as an attachment for existing lawn sprinklers, it will be understood that the same may be produced as an integral part of a sprinkler; and that various modifications may be made of the programmer without departure from the spirit and scope of the invention, as defined in the claims.

What is claimed is:

1. A programmer for a sprinkler, said sprinkler including, support means, a body rotatively mounted on said support means on a generally vertical axis and having a discharge nozzle, mechanism effecting turning of said body, and a movable discharge guide element mounted on the body for turning movement therewith and movable relative to the body for controlling the elevation of discharge of water from said nozzle; said programmer comprising:

a. a circumferentially extended stationary cam of flexible material having a variable cam surface contour;

b. cam mounting means for mounting said cam on said support means in encompassing relationship to said body and supporting said cam in selected contours of said variable cam surface thereof, said cam mounting means defining an annular channel for reception of said cam, said channel having side walls frictionally engaging and holding said cam therebetween;

c. and a cam follower adapted to be connected to said discharge guide element for movements therewith and engaging said cam to impart elevation control movements to said guide element responsive to turning movements of said body, said cam follower being freely movable in said channel in engagement with said cam.

2. The programmer defined in claim 1, in which said cam comprises a length of elastomeric material.

3. The programmer defined in claim 2, in which one end of said cam is anchored to said cam mounting means, said cam mounting means defining an opening transversely of the channel for outward projection of the opposite end of said cam from the channel.

4. The programmer defined in claim 1, in which one of said channel side walls comprises a split cylinder, characterized by yielding means biasing said channel side walls toward each other, whereby to frictionally engage said flexible member.

5. In combination with an oscillating sprinkler comprising, support means, a body rotatively mounted on the support means on a generally vertical axis and having a discharge nozzle, oscillating mechanism effecting turning movement of said body by small increments, and a movable discharge guide element for controlling the elevation of discharge of water from the nozzle; a programmer comprising:

a. a circumferentially extending stationary cam of elastomeric material having a variable cam surface contour;

b. a base member mounted on said support means;

c. cam mounting means on said base member for holding said cam in circumferentially extending relationship about the axis of rotation of said body and in desired varied contours of the cam surface thereof, said cam mounting means defining an annular channel for reception of said cam and including side walls frictionally holding said cam therebetween;

d. and a cam follower on said discharge guide element and movable therewith, said cam follower being freely movable in said channel and engaging said cam to impart elevational control movements to said guide element responsive to turning movement of said body.

6. The programmer defined in claim 5, in which said side walls are cylindrical and generally concentric, said side walls extending upwardly from said base member so that said annular channel opens upwardly.

7. The programmer defined in claim 6, in which one of said cylindrical walls is axially split, characterized by yielding means urging said walls radially toward each other.

* * * * *